United States Patent [19]

Shaw

[11] 3,826,028

[45] July 30, 1974

[54] INFORMATION STORAGE AND RETRIEVAL SYSTEM AND APPARATUS

[76] Inventor: Keith E. Shaw, 1206 Skyline, Tyler, Tex. 75701

[22] Filed: July 24, 1970

[21] Appl. No.: 57,984

[52] U.S. Cl............................. 40/70, 40/31, 35/74
[51] Int. Cl............................................... G09f 11/04
[58] Field of Search.......... 235/78, 88; 35/31 A, 74; 40/70

[56] References Cited
UNITED STATES PATENTS

| | | | |
|---|---|---|---|
| 51,972 | 1/1866 | Rowland | 235/78 |
| 1,495,805 | 5/1924 | Rooney | 235/88 X |
| 3,178,108 | 4/1965 | McCoy | 235/78 X |
| 3,199,227 | 8/1965 | King | 35/74 X |
| 3,289,324 | 12/1966 | Benson | 235/78 UX |
| 3,365,818 | 1/1968 | Greiner | 35/74 |
| 3,436,014 | 4/1969 | Ochonicky | 235/78 |

Primary Examiner—Robert W. Michell
Assistant Examiner—A. J. Heinz

[57] ABSTRACT

An Information Storage and Retrieval System and Apparatus utilizing two relatively movable members, each carrying a series of indicia alignable in various combinations, one member having an aperture or read-out area formed therein for each of the indicia, each of said apertures having a location different or spaced from all the others; the other member having an information record carrying area for each of the indicia on the two members, each such area having a location different from the locations of the other indicia of such members. The indicia on the two members are moved into registry to dispose the read-out aperture or area of said one member at a particular point with respect to the information record carrying area of the other member, whereby the information record on said other member is visible and readable through said aperture or area, the apertures or areas of said one member are each so disposed that no other can be positioned to read-out the information record contained on the information carrying area of the particular indicia on the record carrying member. The members may be concentric discs which are rotatable relative to one another, or strips which are slidable relative to one another, or a strip with a lateral guide movable transversely relative to the strip for locating the separate information carrying area for each indicia combination of the two members. The size and location of the apertures or read-out areas in the one member relating to each indicia bearing area on said member and the record areas on the other member may be arranged to reduce the size of the members and yet provide large readily readable indicia on the members.

5 Claims, 23 Drawing Figures

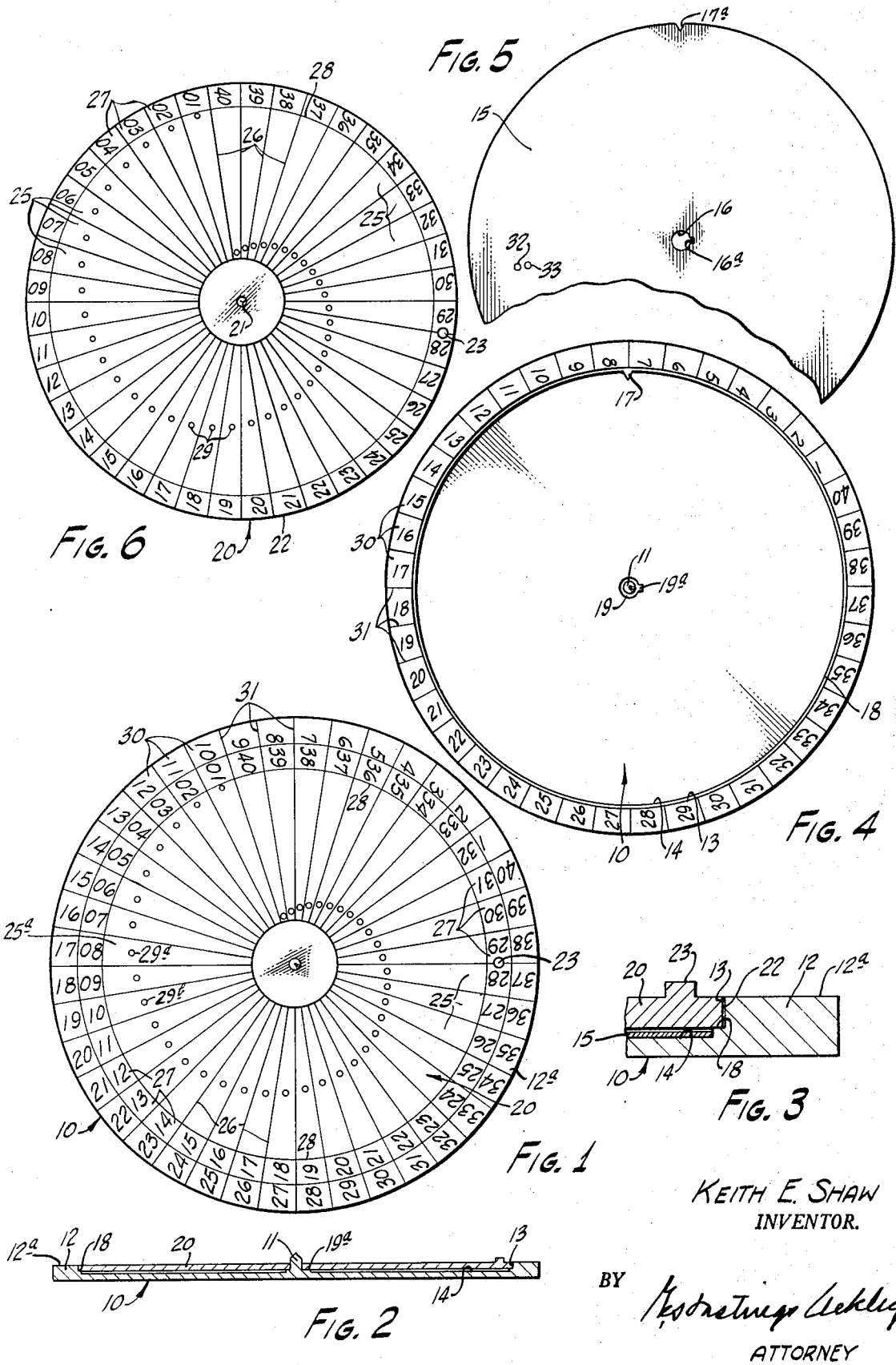

PATENTED JUL 30 1974 3,826,028
SHEET 2 OF 5
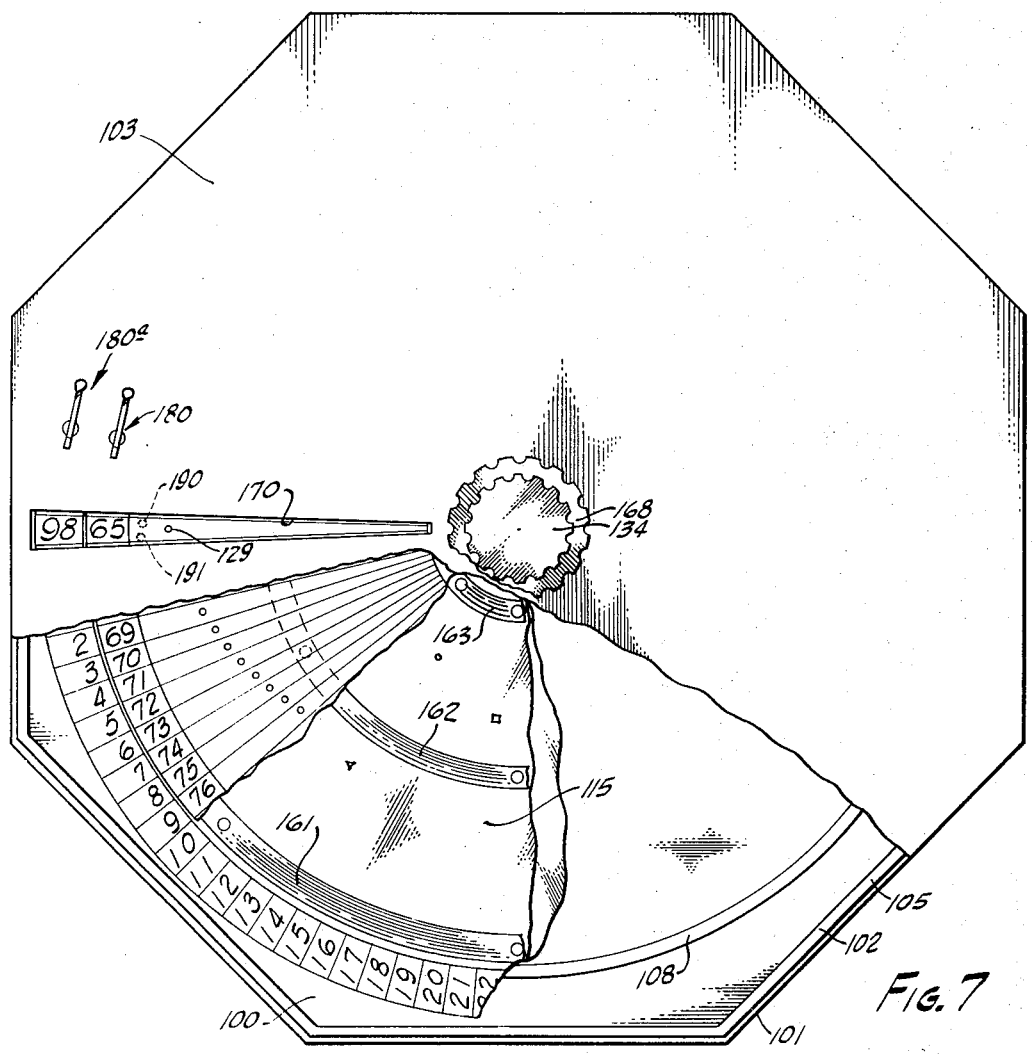
Fig. 7
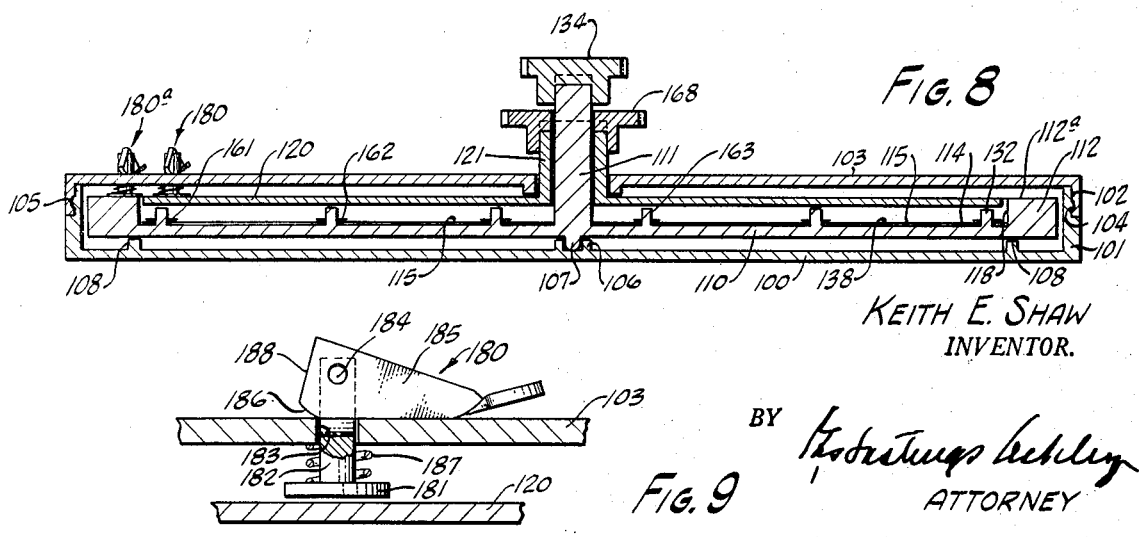
Fig. 8
Fig. 9
KEITH E. SHAW
INVENTOR.
BY
ATTORNEY

KEITH E. SHAW
INVENTOR.

BY
ATTORNEY

INVENTOR.
Keith E. Shaw
BY
ATTORNEY

INVENTOR.
Keith E. Shaw
BY
ATTORNEY

INFORMATION STORAGE AND RETRIEVAL SYSTEM AND APPARATUS

This invention relates to new and useful improvements in information storage and retrieval systems and apparatus.

It is one object of the invention to provide an improved system and apparatus for storing and retrieving information using combinations of letters, or of numbers, or both, to identify a particular piece of information.

A particular object of the invention is to provide a system and apparatus for storing and retrieving information wherein a member having a recording area thereon is movable relative to a member having a read-out aperture or area, each of said members having a particular combination of letters, or of numbers, or both, to indicate a particular location on the information storage member and a particular position of the read-out aperture or area at which information is stored on said storage member for subsequent read-out through said aperture or area when said members are moved to a position wherein a particular combination of letters or numbers, or both, on said members is produced by such indicia placed in registry with each other.

A further object of the invention is to provide an information storage and retrievable system and apparatus of the character described, wherein the relatively movable members are discs each rotatable about a common axis to position a series of combinations of letters, or numbers, or both, in registry to dispose a read-out aperture or area of the one disc at a particular position with respect to the storage area of the other disc.

Still another object of the invention is to provide a system and apparatus of the character described wherein the information storage member comprises an elongate strip having marginal indicia bearing areas having a predetermined combination of letters, or numbers, or both, and the read-out aperture or area bearing member comprises a member having read-out apertures or areas thereon movable transversely of the strip to build a combination of letters, or numerals, or both, for locating an area on the storage member at which the information for such combination is recorded for reading-out through the read-out area of the read-out member.

It is a still further object of the present invention to provide an information storage and retrievable system and apparatus of the character described wherein the members are movable relative to each other manually.

Still another object is to provide an information storage and retrieval system of the character described wherein one of the members is movable relative to the other by power driving means and the other is movable manually.

A still further object of the invention is to provide a device of the character described wherein the two information storage and retrieval members are movable relative to each other by power drive means.

A particular object of the invention is to provide a system of information storage and retrieval and an apparatus for utilizing the system, wherein a record carrying member has provided along a marginal or other predetermined area thereof a series of combinations of numbers, or letters, or both, and wherein the read-out member has provided thereon a series of numbers or letters, or both, arranged to be disposed closely adjacent those of the first or record member to provide a readily legible combination of numerals, letters, or both, and wherein the read-out area or apertures of the read-out member for each number or letter combination are disposed to overlie the recording area of the recording record bearing member at a point separate from the record bearing area on said member for all other combinations of numbers, letters, or both, to provide a read-out for each particular combination of numerals or letters or both.

Still another object of the invention is to provide in a system or apparatus of the character described means for changing, replacing or renewing the record bearing means of the record bearing member, and on which the desired information may be recorded on the replaceable record bearing means of the record carrying member by the user as desired.

Additional objects and advantages of the invention will be readily apparent from the reading of the following description of a device constructed in accordance with the invention, and reference to the accompanying drawings thereof, wherein:

FIG. 1 is a top plan view of an apparatus for the storage and retrieval of information in accordance with the invention;

FIG. 2 is a horizontal cross-sectional view of the same;

FIG. 3 is an enlarged fragmentary sectional view of the device of FIG. 1 showing a replaceable information storage member therein;

FIG. 4 is a top plan view of the information storage or record bearing member of the apparatus;

FIG. 5 is a fragmentary view of a replaceable information recording member for use with the device of FIG. 1;

FIG. 6 is a top plan view of the read-out member of the device;

FIG. 7 is a top plan view, partly cut away, of a modified form of the information storage and retrieval apparatus of the invention;

FIG. 8 is a horizontal cross-sectional view of the device of FIG. 7;

FIG. 9 is an enlarged fragmentary view of a clamping means for holding the members of the device of FIG. 7 in a desired registry with each other;

Figure 10:
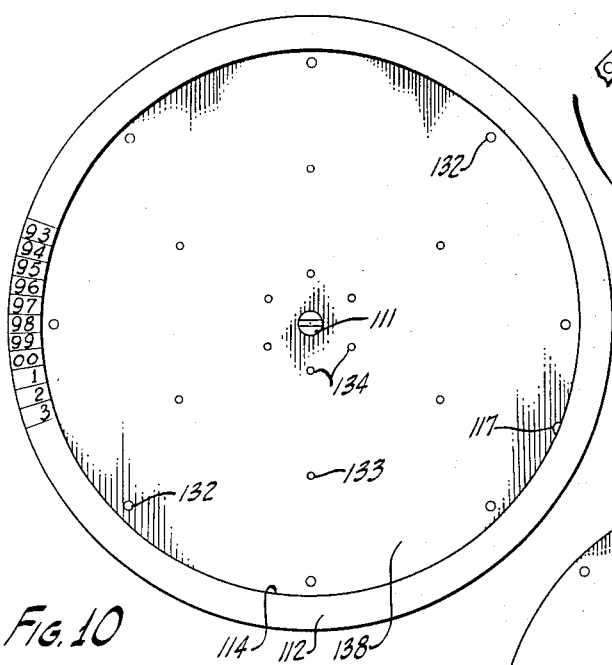
FIG. 10 is a top plan view of the information or record bearing member of the device.
Figure 13:
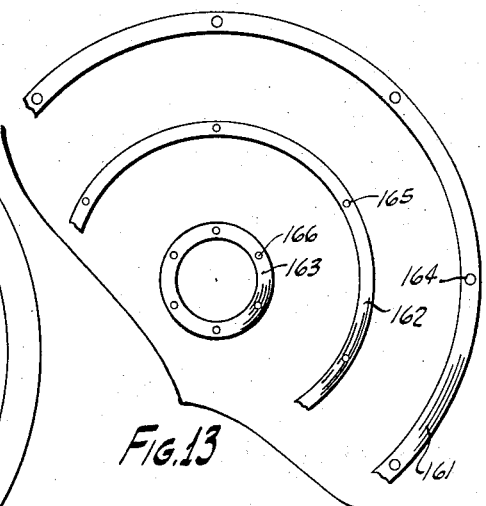
FIG. 13 is a fragmentary top plan view of the hold down members for the replaceable record member of FIG. 11 for use in the device of FIG. 7.
Figure 11:
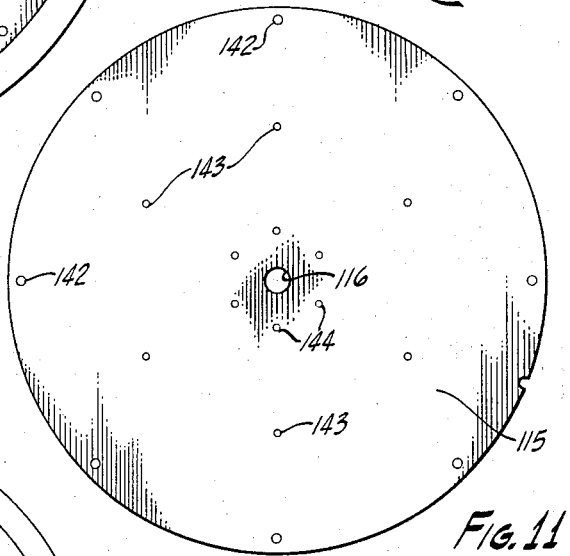
FIG. 11 is a top plan view of a replaceable record receiving member for use in the device.
Figure 12:
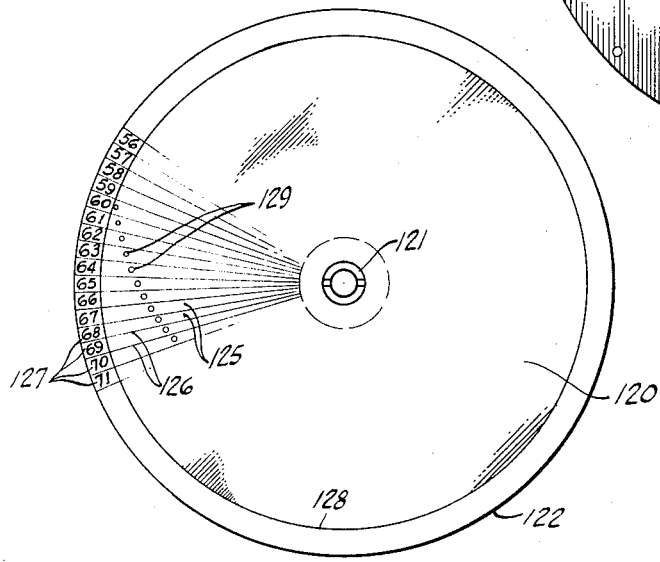
FIG. 12 is a top plan view of the rotatable read-out member of the device of FIG. 7.
Figure 14:
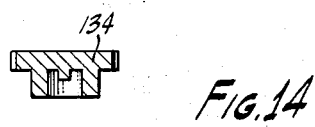
FIG. 14 is a horizontal cross-sectional view of the upper rotating knob for rotating the lower record bearing member.
Figure 15:
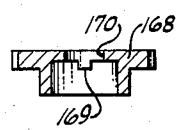
FIG. 15 is a horizontal cross-sectional view of the lower knob for rotating the upper read-out member of the device of FIG. 7.

In the drawings, FIGS. 1 through 6, one form of an information storage and retrieval apparatus for carrying out the system of the invention is illustrated. The device includes a base 10 having a boss or hub 11 projecting vertically therefrom in the center. The base is circular and has an upstanding annular flange 12 around its periphery providing an internal annular shoulder 31 spaced concentrically about the boss or hub 11 and defining the inner edge of the upstanding flange 12. A shallow recess or receptacle 14 is formed in the base, also concentric with the hub and having a slightly lesser diameter than that of the internal shoulder 13, and providing an annular upwardly facing supporting shoulder 18, between the outer periphery of the receptacle 14 and the internal annular shoulder 13.

A cover and information retrieval read-out disc or plate 20, which is also circular and has a central aperture 21 of a size to fit closely about the hub 11 so as to be centered thereby, is disposed within the annular upstanding flange 12 and has a diameter corresponding substantially to the internal diameter of the flange so that the outer peripheral edge 22 of the read-out plate 20 will be disposed closely adjacent the inwardly facing circular shoulder 13 in defining the inner periphery of the flange. The read-out plate 20 is rotatable on the spindle or hub 11, being supported at its central portion on a collar or boss 19 surrounding the hub and having a planar upper surface co-planar with the supporting shoulder 18, and has its outer peripheral edge portion supported on the upwardly facing supporting shoulder 18 adjacent the internal annular shoulder 13. The read-out plate 20 is therefore supported in its center on the collar or boss 19 surrounding the hub 11 and at its outer periphery on the upwardly facing shoulder 18 adjacent the upstanding flange 12. A grip or finger piece 23 is formed on the plate 20 near its outer periphery for manipulation of the plate to cause the same to turn readily within the flange 12. Within the recess or receptacle 14 beneath the cover or read-out plate is disposed a replaceable paper or other suitable marking or record disc member 15, shown in FIG. 5, having a central aperture 16 and a key or lug notch 16a formed therein for engaging over the boss 19 and a radially projecting key 19a on the boss for orienting and holding the record disc against rotation about the hub. If desired, an adhesive may be applied to the rear surface of the disc to hold the same in place in the receptacle 14, or one or more notches 17a may be provided in the peripheral edge of the disc to engage radially inwardly extending detent points 17 at the peripheral edge of the recess 14 to provide added means for holding and orienting the marking or record disc in the receptacle of the base member.

The cover or plate 20 is preferably opaque and is divided into a plurality of sectors 25 of equal arc, defined by radial lines 26 as shown in FIGS. 1 and 6 and indicia, such as a combination of numbers or of letters, or of letters and numbers is marked in an indicia bearing area 27 at the outer end portion of each sector near the periphery of the plate defined by a circle 28 spaced inwardly from the concentric with the peripheral edge 22 of the plate. Each sector is numbered or otherwise identified by the letters or numbers or other indicia marked in each of the areas 27. A similar number of indicia bearing areas 30, formed by radially extending lines 31 forming continuations of the sector lines 26 are marked on the upper surface of the upstanding flange 12 of the base member 10, as clearly shown in FIGS. 1 and 4. Each of the divisions 30 has marked therein indicia consisting of a numeral or combination of numerals, or a letter or a combination of letters, or a combination of letters and numerals.

As shown in FIGS. 1 through 6, the upstanding flange 12 has numerals running from 1 through 40 applied to its upper surface 12a in the divisions 30 thereon. The rotatable plate 20, similarly, has numbers from 01 to 40 marked in the indicia bearing areas 27 at the outer peripheral edge of the plate. While forty divisions have been shown, it is preferable that division be provided in groups of numbers raised to powers of 10 on each of the body member flange 12 and of the read-out plate 20. If 100 divisions are used, there would be 100 indicia bearing areas 27 on the read-out plate and 100 indicia bearing areas 30 on the flange 12 of the base member 10. Such a combination of divisions would provide for 10,000 pieces of information to be stored and retrieved in the device.

As is shown in FIGS. 1 and 6, a read-out area or aperture 29 is formed in each of the sectors of the rotatable read-out plate 20, located between the radial sector dividing lines 26 and spaced inwardly from the circle 28 defining the indicia bearing areas 27, and from the next adjacent aperture, a distance at least equal to the width of the apertures 29. It will readily be seen that each aperture 29 will be disposed and travel in a path within a circular area concentric with the hub 11. Thus, when the numerals in two indicia bearing areas 27 and 30 are arranged in registry with each other; as, for example, to build the number 1708 in FIG. 1, the division aperture 29a in the sector 25a of the read-out plate 20 will be disposed above a particular point on the record disc 15 spaced inwardly from the peripheral margin thereof and located on the surface at a point determined by the position of the aperture 29 on the disc thereabove when the two members 17 and 08 are disposed in registry to form the combined number 1708. The area is indicated at 32 on the marking or record disc 15 shown in FIG. 5. If the plate 20 is rotated about the hub 11 to position the numeral 10 on the indicia bearing area 27 of the plate in alignment or registry with the number 17 of the upstanding flange 12 of the base member, the viewing hole or aperture 29b, will be disposed at a point spaced inwardly radially from the area 32 of the record disc 15 a distance equal to the diameter of one of the apertures 29 and provide a read-out area or information record area 33 which will underlie the aperture 29b in the plate 20 in the sector 25 having the numeral 10 in the marginal indicia carrying area 27. Similarly, the apertures in each of the other sectors of the read-out plate will be spaced radially toward the center of the disc from the others to travel in a separate circular path from that of any other number on the plate. Thus, the aperture or read-out areas of each of the sectors is spaced radially from the center of the disc to lie in an area and travel in a circular path distinct from the circular path of any other aperture or read-out area. In this form of the device, the apertures or read-out areas 29 form a spiral extending from the outer periphery of the sectors adjacent the circle 28 defining the inner edges of the indicia bearing areas 27 inwardly to a point in said sectors where the diameter of the read-out area or aperture is substantially equal to the width of the sector at that point. Thus, information such as the credit standing for particular account numbers may be recorded on the surface of the record disc 15 at the several points thereon which will be in registry with the aperture in the read-out plate 20 when the particular combination of numbers is built up by positioning the indicia bearing areas 27 and 30 adjacent each other to form the desired combination of numbers, as was the case when the number 1708 was formed. By providing base members and plates of suitable size, and dividing them into a suitable number of sectors, as for example 100 or possibly 1,000 on the rotatable read-out plate and a similar number on the upwardly facing surface 12a of the upstanding flange 12 of the base member, any desired number from 000001 to 999,999 may be formed by moving the plate with respect to the base to a position to dispose the indicia bearing areas 27 on the rotatable plate in registry with the indicia bearing areas 30 on the upper surface 12a of the flange of the base to produce the desired combination of numbers. The aperture or read-out area 29 for that particular combination of numbers will then be registered with a particular information record area on the record disc 15, so that the information stored in such area may be retrieved through the aperture or read-out area. The plate 20 may be opaque and have apertures formed therein or may have clear areas formed therein corresponding in size to the openings or apertures 29 and disposed to overlie a particular area on the disc 15 for a particular combination of numbers, or of letters, or of both numbers and letters, in the indicia bearing areas 27 and 30, it being the intent of this invention to utilize numbers or letters, or both, to build desired particular combinations thereof.

If an account having a particular number has a good credit record, for example, a green colored dot may be marked on the record disc 15 at the point thereon which will be in registry with the read-out opening 29 when the particular combination of numbers on the plate and the base member are built by moving the plate with respect to the base member to produce the desired combination. If the account has a bad credit record, a red colored spot may be placed on the record disc 15 at such area, or any other suitable or desirable information indicating symbols or means may be used to provide a desired type of information with respect to the particular combination of numbers or letters or both.

It is readily apparent that, if desired, the record disc 15 may be removed and replaced with a clean disc or with a disc printed with different information on the various areas to be located by the movement of the read-out plate 20 with respect to the base member to produce a selected particular combination of members or letters in the indicia bearing areas. It will also be seen that the device may be utilized in stock rooms for the purpose of providing a record of parts by numbers, or for various other purposes.

A modified form of the invention is shown in FIGS. 7 through 15, wherein a case or housing base or bottom member 100 has an upstanding marginal edge flange 101 which is externally reduced at its upper end for receiving and depending flange 102 of a cover 103. An internal annular detent recess 104 is formed in the depending flange of the cover and engages over an external annular projecting detent ring flange 105 on the reduced upper portion of the flange 101 to hold the cover in place on the base member. As shown, the housing is constructed in an octagonal shape, to facilitate handling, but may be of any other desired shape, such as square or circular.

A socket or bearing ring 106 is formed in the center of the base member 100 and projects upwardly thereupon to provide a socket in which a pin or trunion member 107 on the underside of the lower rotating record carrying base member 110 is disposed to center the record carrying base 110 in the housing for rotation about the center formed by the trunnion or pivot 107. An outer annular upstanding supporting flange or bearing ring 108 is formed on the upper surface of the bottom 100 of the case or housing and extends completely around the central bearing ring 106 to provide a supporting or bearing surface for supporting the rotatable record carrying base 110 for rotation in the housing. An upstanding projecting shaft or hub 111 is formed in the center of the record carrying base 110 and projects upwardly therefrom above the pin or trunion member 107, and an operating handle 134 is keyed or otherwise secured on the upper end of the projecting shaft to provide means for rotating the rotatable record carrying base 110 in the housing. The base has an upstanding peripheral flange 112 corresponding substantially to the upstanding flange 12 of the form first described. An indicia carrying surface 112a is formed on the upper exposed surface of the flange 112, and the internal annular space in the base within the periphery of the annular flange provides a receptacle 114 for a paper or other record disc 115, shown in FIG. 11, which has a central aperture 116 therein adapted to receive the shaft 111. A key notch 117a is provided in the marginal peripheral edge of the record disc 115 for orienting the same with respect to the rotatable record carrying base member 110. A plurality of openings 142 at a plurality of circumferentially spaced points along the outer marginal portion of the record disc are formed therein for fitting over upstanding pins or bosses 132 projecting upwardly from the bottom 138 of the receptacle 114 in the rotatable record carrying base member 110. Similar smaller apertures 143 are formed at a point intermediate the radial distance between the center aperture 116 and the outer periphery of the disc 115, and these apertures are adapted to receive upstanding smaller pins 133 projecting upwardly from the bottom of the receptacle 114. A third inner series of apertures 144 are formed in the record disc closely adjacent the central aperture 116 and receive upstanding pins 134 projecting upwardly from the base to register with the aperture in the disc. As shown, there are six apertures 144, six apertures 143, and eight apertures 142 in the record disc, and a corresponding number of pins 132, 133 and 134 projecting from the bottom 138 of the recess 114 in the record carrying base member.

A read-out plate or cover 120, having a central hub sleeve 121 which fits closely over the upstanding shaft 111 of the record carrying base 110, has a diameter which is such that its peripheral edge 122 lies adjacent the inwardly facing shoulder 118 defining the inner surface of the upstanding flange 112 of the base member. The read-out plate 120 is similar in all other respects to the disc 20 of the form first described and is divided into a plurality of sectors 125 by sector lines 126 extending radially from the center of the plate to the outer peripheral edge thereof. A circle 128 concentric with the center of the read-out plate also defines marginal indicia bearing surface areas 127, in which a combination of numbers, letters or letters and numbers is imprinted or otherwise provided. Apertures 129 are formed in each of the sectors in the same manner as apertures 29 of the form first described, and these apertures will overlie a particular area of the record disc 115 carried by the base member 110 in the same manner as those in the form first described. Indicia bearing areas 130 are defined on the upper surface 112a of the upstanding flange 112 of the rotatable base member, the extended sector lines 131 defining each record bearing area 130 for receiving numbers, or letters, or a combination of numbers and letters, in the same manner as in the form first described. The lines 131 defining the indicia bearing area 130 form extensions of the sector lines 126 defining the sectors 125 on the rotatable read-out plate 120. The read-out plate is generally opaque and has either apertures 129 or transparent areas formed therein disposed to overlie a particular area of the record disc 115 disposed therebelow when a particular combination of letters or numbers has been produced by bringing the proper combination of such indicia on the indicia bearing areas 130 and 127 into radial alignment or registry with each other.

A sector shaped aperture or opening 170 is formed in the cover 103 of the housing and is of a size and shape to overlie and expose only one sector 125 and record bearing area 130 on the exposed base member 110 and read-out plate 120, as shown in FIG. 7. Similarly the aperture or read-out area 129 for the particular sector 125 of the rotatable read-out plate 120 is exposed in the opening 170, and the information recorded on the record disc 115 below the aperture 129 is exposed through the opening 170 when the proper combination of numbers or letters has been obtained, as shown at the left of the opening, in FIG. 7.

A plurality of hold down rings or weights 161, 162 and 163 are provided for holding the record bearing disc 115 in place on the pins 132, 133 and 134 in the receptacle 114 in the base member 110. Apertures 164 are provided in the ring 161 at points registering with the pins 132 on the base member, and the weight of the ring is sufficient to hold the outer portion of the paper record disc down flat on the bottom surface 138 of the recess 114. Also, apertures 165 are formed in the ring 162 for engaging over the pins 133 for holding down the central portion of the paper record disc, and apertures 166 are formed in the ring 163 for engaging over the pins 134 to hold the inner portion of the paper record disc flat against the bottom surface 138 of the base member. The pins extending through the apertures in the paper disc will provide a drive for moving the paper record disc with the rotatable base member 110. The notch 117a provides means for correctly orienting the record disc when it is placed in registry with the radially inwardly projecting key or rib 117 on the flange 112 in the receptacle 114 in the record carrying base member, and the weight rings hold the paper flat in the receptacle. Of course, if desired, suitable adhesive may be provided on the underside of the paper record disc for holding the same flat after it has been oriented by means of the notch 117a or other suitable orienting means. The paper record disc is replaceable as desired in the same manner as that of the form first described. The tubular sleeve 121 on the rotatable read-out plate 120 has a knob 168, keyed as at 169, on the upper end thereof, the knob having a central aperture 170 therein for sliding over the shaft 111 to engage on the upper end of the sleeve or hub 121 and provide means for turning the read-out plate 120. The diameter of the knob 168 is greater than that of the upper knob 134 secured on the shaft 111 of the base member to facilitate handling and manipulation of the knobs and rotation of the read-out plate and base member.

A frictional clamping means 180 (FIG. 9) is mounted on the cover plate 103 and has a clamping shoe 181 carried by an elongate vertical shaft 182 extending upwardly through an aperture 183 in the cover plate and hinged by a pin 184 to one end of a cam lever 185 having a cam surface 186 thereupon. A helical coil spring 187 is provided between the foot 181 and the underside of the cover plate 103 for biasing the foot member downwardly toward the rotatable read-out plate 120 therebelow. The camming surface 186 of the cam member 185 is such that, when the lever is in the position shown in FIG. 9, the clamping foot 181 will be held out of engagement with the plate 120. However, when the lever 185 is swung in a counter-clockwise direction about the pin 184, the shorter lever arm section 188 of the cam arm will be in engagement with the upper surface of the cover plate 103 and permit the spring to bias the foot 181 downwardly to frictionally engage the rotatable plate 120 to hold the same in a fixed position with respect to the opening 170 in the cover plate. An identical clamping means 180a is provided adjacent the clamping device 180 and positioned to overlie the upwardly facing surface 112a of the rotatable base member 110. The shoe of the clamping device 180a will engage the upper surface 112a of the upstanding flange 112 and hold the record carrying base member against movement from its selected position with respect to the opening 170 in the cover plate. Thus, the two clamping members 180 and 180a will hold the two movable members 110 and 120 in a position in which a particular combination of letters or numbers is built up and displayed, shown in FIG. 7 to be 9865, for reading through the opening 170, for use by the operator to view through the aperture or read-out area 129 in the upper read-out plate for information recorded or stored on the paper disc 115 therebelow carried by the lower rotatable record carrying base member 110.

The operation of this form of the device is the same as that of the form first described. However, all information on the movable members is obscured by the cover plate 103, and only that appearing in the opening 170 is readable by the operator or others. Also, this structure permits the use of a larger diameter base member and read-out plate and a greater number of numbers or letters on each of the members may be used to obtain a greater combination of numbers, or letters, or both. Obviously, a thousand indicia bearing areas 130 may be provided on the outer upwardly facing surface 112a of the lower record bearing base member 110, and a similar number, 1,000 numbers or letters, may be imprinted or otherwise marked on the indicia bearing area 127 of the upper read-out plate 120. Such an arrangement would give a possible one million different combinations of letters or numbers. The apertures 129 register with a particular area on the record disc or paper disc 115, since the apertures are spaced radially of the upper disc to move through a circular path which does not overlie any record bearing area on the disc of any other combination of letters.

It is believed readily apparent, that as shown in FIG. 7 in dotted lines, two or more information recording areas may be provided within the sector margin lines 126 near the circle 128 on the record disc 115 beneath the upper rotatable read-out plate 120, so that with respect to the number 98 shown on the indicia bearing area 130 on the base member, two areas near the inner limit of the indicia bearing area 127 defined by the circle 128, will be usable on the record disc 115 beneath the rotatable read-out plate 120. For example, the number on the read-out plate 120 for the area covered by the upper dotted line 190 could be the sector numbered 60 on the read-out plate. Since the aperture 129 overlying the area 190 would exclude any information appearing in area included only within the lower dotted area 191, that information would not be read when the combination number 9860 appeared in the opening 170. However, the sector numbered 70 on the read-out plate 120 could have an aperture 129 formed therein overlying the area 191 when the combination number 9870 is displayed in the opening 170, the adjacent imperforate opaque portion of the plate above the aperture 129 excluding a view of the record area 190. In this way more numbers may be provided on a record disc of a smaller radius, if desired.

The duplication of areas may extend radially inwardly toward the center of the record disc 115 so long as there is ample space between the radial sector dividing lines 126 to record the desired information on the record disc 115 in a position to be read through an aperture 129 in the read-out plate without disclosing the information in the other adjacent area. When there is insufficient area between the radial sector dividing lines 126 for more than one record on the record disc 115, a lesser number of apertures and record areas may be provided until only a single one is usable. In such an event, single areas would be used spaced inwardly toward the center of the record disc a distance at least equal to the inner and outer radial limits of the record area on the record disc. Such structure would permit the use of a greater number of record areas and sectors on a disc having a smaller radius.

Still another form of the information storage and retrieval device is shown in FIGS. 16 through 20, wherein a base 200 has a cover plate 201 secured thereto by screws or the like 202. A supporting frame or bracket 205 has a pair of upstanding legs 206 and a cross plate 207 extending between the legs, for a purpose which will be hereinafter more fully explained. Flanges 208 are provided on the lower ends of the legs 206 and are bolted to the base 200 by screws or other means 209 to hold the frame 205 in place on the base. A pair of spools 210 and 211 are mounted on stub shafts 212 and 213, respectively, on one upright leg 206 of the frame, and have a crank shaft 214 and 215, respectively, having key lugs engaging in key ways 216 and 217, respectively, formed in the bores 218 and 219 in the shafts of the spool. This provides a drive similar to that used in roll film cameras.

The crank shaft 214 has a flange 220 provided thereon and a spring 221 is confined between the case and the flange and biases the crank shaft toward the spool at all times. The flange 220 also provides a bearing for the shaft 214. A crank member 222 is formed on the outer end of the shaft outside the case cover 201 and has a projecting crank handle 223 which may be grasped by the operator or user to turn the reel within the housing. The crank shaft 215 also has a flange 225 on its inner end engaging the outer surface of the uprights or legs 206 of the frame. A spring 226 confined between the flange and the upper wall of the cover 201 biases the crank shaft 215 toward the spool 211 in the same manner as the crank shaft 214 is biased toward the spool 210. A crank member 227 is provided on the outer end of the shaft 215 and has a crank handle 228 by means of which the crank member may be turned to turn the shaft 215 and thereby turn the spool 211.

Figure 17:
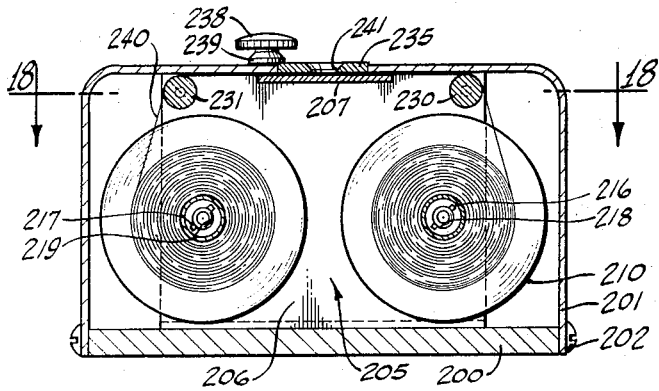
FIG. 17 is a vertical cross-sectional view taken on the line 17 — 17 of FIG. 16.
Figure 18:
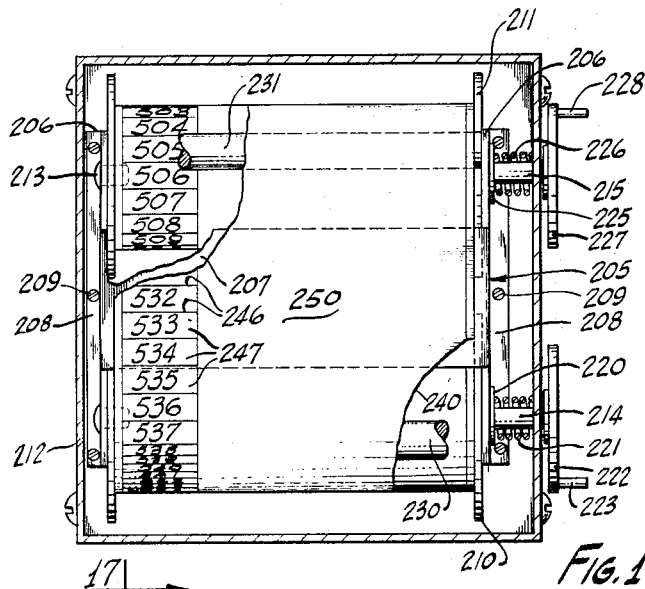
FIG. 18 is a horizontal cross-sectional view taken on the line 18 — 18 of FIG. 17.

Idler rollers 230 and 231 are supported between the spaced uprights or legs 206 of the frame above the spools 210 and 211, respectively, and provide a support for an elongate tape record member 240 which is wound on the spools 210 and 211, as is clearly shown in FIGS. 17 and 18. The tape record is threaded over the horizontal support plate 207 of the frame between the idler rollers 230 and 231 and is stretched tight beneath the cover 201 and above the support plate.

An elongate transverse aperture 235 is formed in the cover 201 immediately overlying the supporting plate 207 and having a narrower transverse dimension or width than that of the plate. A sliding viewer or read-out member 236 is slidable in the aperture above the plate 207 and is held in place therein by a thumb screw 238 having a flange 239 at its lower end engaging the upper surface of the slide plate 236. A read-out aperture or space 241 is formed in the slide, which may be an aperture, or a transparent viewing area surrounded by a circular opaque line 242 to define an area within the confines of the line or within the aperture through which recorded information may be read out or retrieved from the tape 240 therebelow. An indexing line 243 is provided centrally of the aperture and extending vertically to the edge of the sliding read-out member 236, and this line may be positioned in registry with numerical or letter indicia 244 engraved or printed or otherwise provided on the cover 201 and spaced apart a distance equal to the diameter of the aperture 241 or the inside of the circular read-out opaque ring 242.

Figure 16:
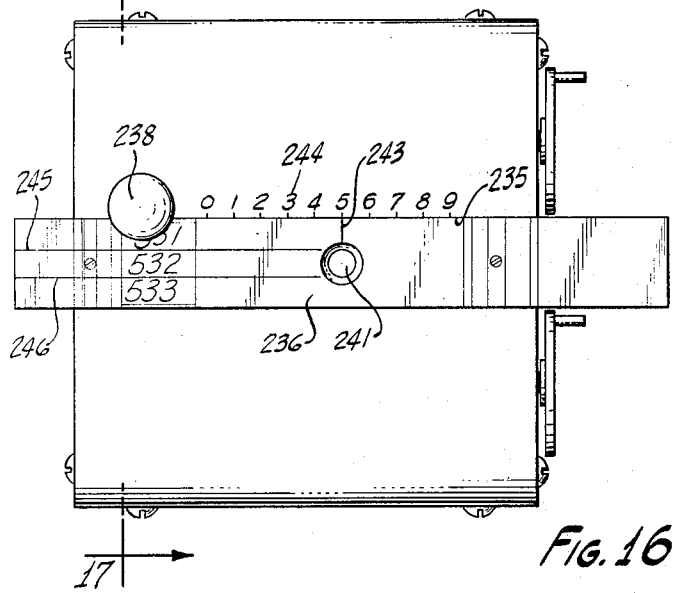
FIG. 16 is a top plan view of a further modified form of the information storage and retrieval device of the invention.

Thus, when the sliding read-out member 236 is moved transversely of the case, and transversely of the tape 240 carried in the case, the indicator line 243 may be registered with one of the numerals or letters 244 on the case. As shown in FIG. 16, the indicator line is registered with the line for the number 5, and the reading thus is for the combination of letters 5325. Any information recorded on the surface of the tape between the indicia bearing marginal areas 247 and the opposite edge of the tape will be visible through the aperture 241 or within the circle 242.

Guide lines 245 are provided on the sliding read-out member for registry with the division lines 246 on each side of the indicia bearing areas 247 on the tape or record belt 240. When the sliding read-out member 236 has been moved to register the indicator line 243 with a desired number or letter 244, the slide may be secured in such adjusted position by the thumb screw 238 and clamped by the flange 239 against movement. The belt or tape 240 may then be moved by means of the cranks 222 and 227 to position the desired combination of numbers in registry with the guide lines 235 on the slide. When a desired combination of numbers has been built up by positioning the tape and the slide to produce the desired combination, the information area within the circle 242, or within the aperture 241, will be exposed for reading by the user.

The elongate belt provides means for storage of greater number of pieces of information on the record area 250 of the tape, and while only ten numbers 244 have been shown on the case 210, it is obvious that any desired number may be provided by increasing the width of the case, reducing the size of the aperture or read-out circle, or both. Thus, any desired combination of letters, or numbers, or both, may be obtained.

Figure 19:
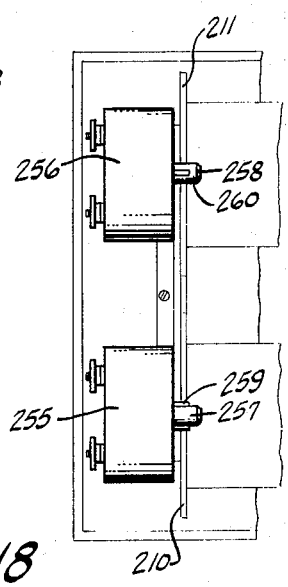
FIG. 19 is a fragmentary schematic sectional view of the device of FIG. 16, showing power drive for the spools on which the recording strip is mounted for power actuation of said strip.

It is believed that it is readily apparent that the reels 210 and 211 may be rotated by electric motors if desired. Such a drive is shown in FIG. 19, wherein the motors 255 and 256 are secured to the upright or leg of the frame and are connected to the reels 210 and 211, respectively. The motors have their shafts 257 and 258, respectively, extending into the apertures in the reels and the shafts are provided with keys or lugs 259 and 260, respectively, engaging in the key slots or ways 218 and 219, respectively, in the shafts of the reels or spools. The motors are secured to the upright frame members 206 within the cover and replace the cranks 222 and 227.

Figure 20:
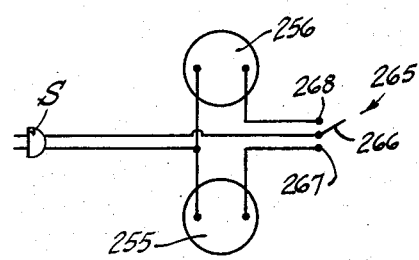
FIG. 20 is a wiring diagram showing the manner in which the operation of the motors of FIG. 19 is controlled.

The electrical wiring diagram for control of the motors is shown in FIG. 20, wherein the motor 255 is energized when a single pole double throw switch 265 is moved to establish an electrical circuit between a source of electrical power S and the two contacts of the motor 255. This causes the motor 255 to rotate the reel 210 to wind the record tape or belt 240 onto that reel. The resistance to movement of the reel 211 by the motor 256 will hold the tape stretched taut. To reverse the direction of movement the switch 265 is moved to establish a circuit between the source of power S and the contacts of the motor 256. In closing the circuit to operate the motor 255, the single pole double throw switch 265 is moved to move the blade 266 thereof into engagement with a contact 267 to close the circuit between the source and the motor. To energize the motor 256, the blade 261 is moved in the opposite direction to engage a contact 268 to close the circuit to the motor 256 to cause the reel 211 to rotate the wind the tape or record strip 240 onto that reel.

Figure 21:
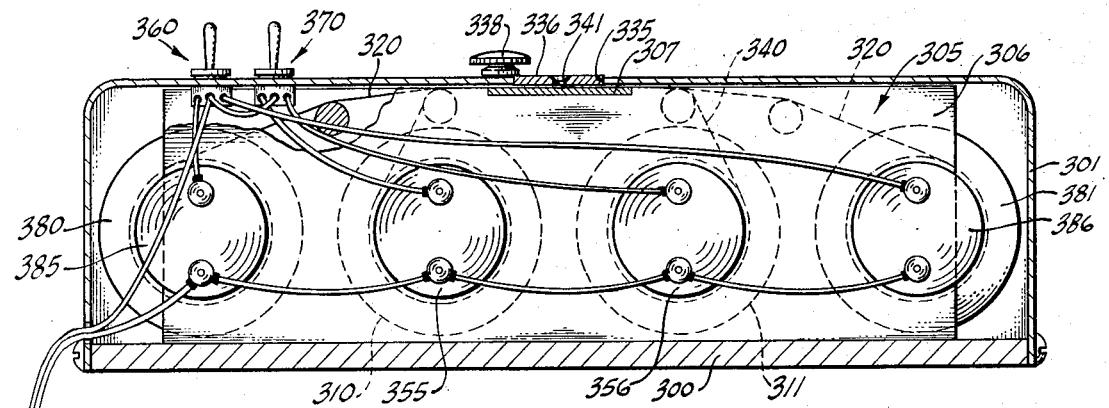
FIG. 21 is a vertical sectional view, similar to FIG. 17, showing a further modified form of the information storage and retrievable apparatus having a pair of elongate strips movable relative to each other and showing the same movable by power means.
Figure 22:
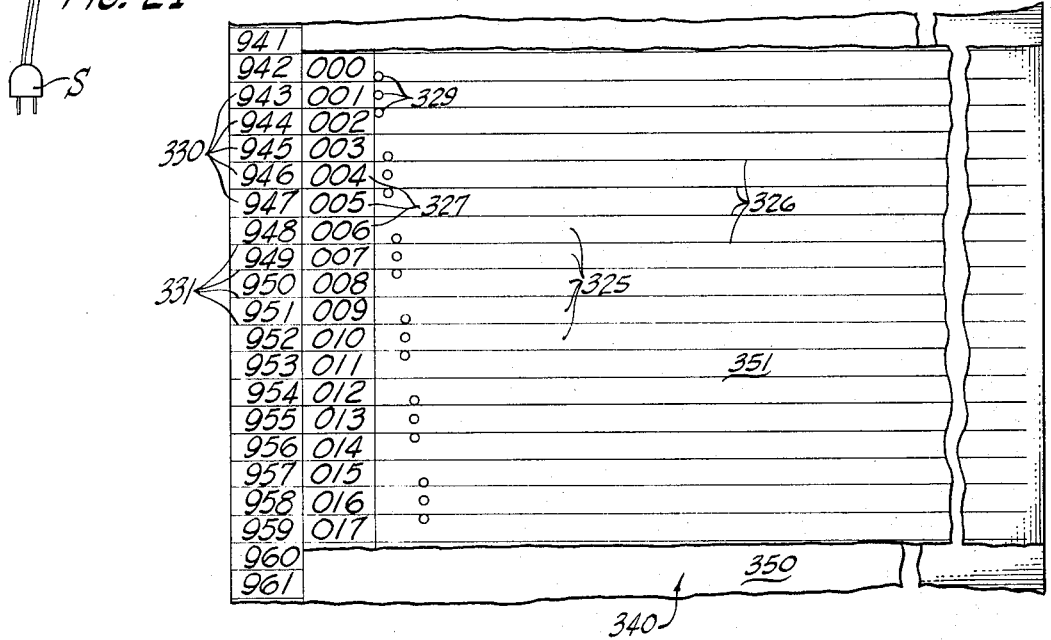
FIG. 22 is a top plan view of the strips of the apparatus of FIG. 21.
Figure 23:
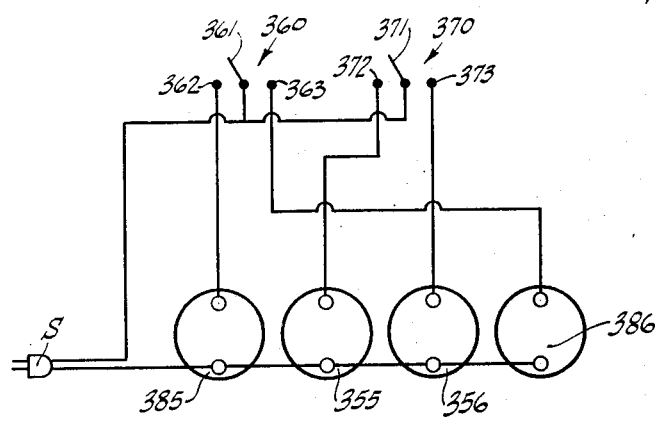
FIG. 23 is a wiring diagram for the electrical control system for the device of FIG. 21.

A further modification of the device is shown in FIGS. 21 through 23, wherein two pairs of reels are provided for moving two elongate tapes or belts with respect to each other. In this form the device has a base 300 and a cover or case 301. The frame 305 is secured to the base and has a pair of spaced uprights or supporting arms 306 which extend upwardly from the base and have a supporting member of plate 307 which extends transversely between the uprights medially of their upper ends in the same manner as that of the form just described. A transverse aperture 335 is formed in the cover 301 above the plate 307, and the two tapes move between the plate and a transverse read-out viewing cover 336 secured in the aperture by means of a set screw or thumb bolt 338.

The spools 310 and 311 carry the lower record tape or strip 340 upon which the record is stored for retrieval, and a read-out strip 320, identical in general configuration but narrower, is carried by spools or reels 380 and 381. The spools all are mounted in the frame 305 between the uprights 306, but the spools 380 and 381 are spaced outwardly on either side of the inner rolls 310 and 311 carrying the lower record tape. The read-out tape 320 carried by the spools or reels 380 and 381 overlies the record tape and has on its left margin indicia bearing areas 327 of the same width as the indicia bearing areas 330 of the lower tape 340. The numbers on each of the tapes run from 000 to 999, so that a million combinations of numbers can be obtained by moving the strips longitudinally with respect to each other to position particular combinations of numbers together.

In this form the reels or spools driven by individual electric motors which are mounted on the frame 305 and each connected to the spindle or shaft of one of the reels in the same manner as the motors of the form illustrated in FIG. 19 for driving the same. Switches 360 and 370 are connected to a source of power S and with the motors for controlling actuation thereof. The circuit illustrating the electrical power supply to the motors and the switching arrangement is shown in FIG. 23, wherein a single pole double throw switch 360 is attached to one side of the power supply from a source S and the pole 361 thereof is swingable between two contacts 362 and 363 for controlling the actuation of the motors 385 and 386, respectively, connected to the reels 380 and 381, respectively. The other switch 370 is connected to the same power supply S and the single pole 371 thereof is operable to engage to contacts 372 and 373 which are connected to the motors 355 and 356, respectively which operate the reels 310 and 311, respectively. By swinging the blades or poles of each switch between the two contacts of the switches, a selected one of the motors is energized and the reel driven thereby caused to move the tape carried by the reels in the direction of the motor energized.

All the other details of the mechanical operating parts of the device are the same as those already described. However, a single transverse aperture or opening 341 is provided in the read-out viewing cover 336 carried by the cover or case 301, and this opening is of a width identical to the width between the dividing lines 331 and 326 of each of the indicia bearing sections 330 and 327, respectively, of the two tapes or strips. As shown in FIG. 21 the upper read-out tape 320, carried by the reels 380 and 381, is disposed with the indicia bearing marginal edge portion adjacent and to the right of the indicia bearing marginal edge portion of the lower record strip 340. When the lines outlining the indicia bearing areas 330 and 327 are placed in registry, a particular number combination is formed and is visible through the opening 341 through the read-out plate 336 carried by the case.

As is shown in FIG. 22, a plurality of read-out apertures 329 may be formed in each horizontal division area. For example, on the indicia bearing area 327 marked "000," an aperture 329 is provided in the lower one-third of the vertical space between the lines 326 and at the marginal edge of the read-out area 351 on the read-out tape 320. Similarly, in the indicia bearing area marked "001," the aperture 329 is provided in the middle portion of the space between the two lines 326 defining the read-out space for that number, while for the indicia bearing area carrying next number "002," the aperture 329 is provided in the upper portion of the vertical space between the two lines 326 defining the read-out area for that number. It will thus be seen that three apertures may be disposed to move along a single longitudinal path along the read-out area 350 on the record tape 340, by spacing the apertures vertically in the horizontal read-out area 325 defined between the two lines 326 defining the indicia bearing area 327. Thus, when the number "002" is positioned adjacent another number on the indicia bearing area 330 of the record tape 340, the area on the record tape which will be exposed through the aperture is that underlying the aperture in the upper portion of the space between the two horizontal lines 326 and to the marginal left portion of the read-out area 351. Similarly, should the number "001" on the read-out tape 320 be disposed in registry with a number such as "950" on the record tape 340, the area visible through the read-out aperture 329 will be that in the middle portion of the space between the two lines 326 adjacent the marginal edge of the read-out area 351, while the number "000" on the read-out tape placed next to the number "950" on the record tape would expose the area on the record read-out area 350 underlying the lower one-third of the space 325 between the two marginal lines 326 and at the left margin of the read-out area 351. The aperture for each of the series of numbers on the read-out tape 320, as shown in FIG. 21, is disposed at a different point with respect to all other read-out apertures, and lateral width is required to accomodate the full series of record areas on the record strip therebelow than would be necessary if the apertures 329 were as large as the distance between the dividing lines 326.

To operate the device, the switch 360 is operated to move the pole 361 toward the left in FIG. 22 to engage the contact 362 which will energize the motor 385 driving the reel 380 and draw the upper read-out tape or strip 320 toward the reel 380 and so expose numbers in ascending order. The switch 370, turned to swing the pole 371 to engage the contact 373 will energize the motor 356 driving the reel 311 and turn the lower record strip 340 carrying the record bearing area 350 thereon toward the reel 311 and expose the series of numbers on the left hand marginal indicia bearing areas 330 in descending order. Of course, the motors may be reversed to reverse the direction of movement of the tapes and to expose a desired combination of numbers in the read-out opening 341 in the plate 336. As is shown if FIG. 21, a symbol such as an "X" or a "cross" may be utilized to indicate a particular number. Also, a color such as red, green or yellow, or the like, may be utilized to indicate information of various kinds, such as credit standing, validity, cancellation and the like.

It is also believed readily apparent that the record tape 340 may be marked through the aperture 329 in the read-out tape 320 by the operator of the machine to record desired information on the lower or record tape for subsequent reading out through the apertures in the read-out tape. This is true of any of the various forms shown where an aperture is provided in the read-out member; such as the read-out disc 20 of the form first described, the read-out disc 120 of the second form, and sliding plate member 236 of FIG. 16, and the movable strip 320 of the form just described.

It is also readily apparent that the strips 240 and 340 may be changed in the same manner as the record discs 15 and 115 of the forms first described; and, that, if desired, a record strip or disc from a central source of information may be sent to a number of remote users of the devices for conveying information to such remote points from the central source, such as from a central credit office to filling stations, motels, or other similar users of the devices. The numbers may correspond with those of credit cards, or account numbers, or parts numbers, or any other desired identifying indicia and the information recorded may be any desired other than or in addition to credit status of stock, availability of rooms, and so forth.

It is obvious that a leader portion should be provided at each end of the strips to permit the indicia bearing areas thereon to be moved to position to be observed by the user through the viewing openings.

It is readily apparent that, if desired, the record tape or strip 240 or 340 may be formed as a continuous or endless tape wound over suitable take-up reels, so that numbers at either end of the series of numbers appearing on the indicia bearing areas 247 or 330 of the strip or tape might be reached quickly by turning from a low to a high number or vice versa, without the need for reversing or rewinding the entire strip.

Also, it is believed readily apparent that a Mobius strip or tape might be used for the record tape or strip 240 or 340 and so provide for utilizing both surfaces of the strip or tape. This would permit the use of a strip or tape on the lower or record strip only half the length otherwise required for the same number of indicia bearing areas, since both sides of the strip would be used. This strip would also be reversible so that members of the opposite ends of the series of numbers or letters could be reached quickly without a complete rewinding of the entire strip.

The foregoing description of the invention is explanatory only, and changes in the details of the construction illustrated may be made by those skilled in the art, without the scope of the appended claims, without departing from the spirit of the invention.

What is claimed and desired to be secured by Letters Patent is:

1. Information storage and retrieval apparatus including: a first member having a receptacle therein with a central hub; record means having a central aperture therein insertable in and removable from said receptacle of said first member and having a marking surface providing information marking and read-out recording areas thereon; coengageable orienting means on said record means and said first member holding said record means in oriented position in said receptacle; a second member carried by said first member completely overlying said receptacle and said record means in said receptacle; said second member having a plurality of separate marking and read-out recording apertures thereon each overlying a separate distinct one of the marking and read-out recording areas of said record means adapted to have a marking instrument inserted through said apertures to mark the marking surface of the record means under and in registry with said apertures, whereby marks may be made through said apertures on said surface of the record means and said marks on said surface may be read subsequently through said apertures when said apertures are again disposed in registry with said recording areas bearing said marks; indicia bearing areas on said first member and on said second member disposed along their marginal edges closely adjacent each other to coact with each other; indicia on said indicia bearing area on each of said members comprising a plurality of combinations of numbers, letters or both numbers and letters; said second member and said first member being movable relative to each other to move said indicia bearing areas into position adjacent each other to produce a predetermined combination of indicia appearing on adjacent selected registering adjacent areas; said recording areas of said record means in said first member and said apertures in said second member being movable with respect to each other to a position in which each said marking and read-out aperture of said second member is disposed at a particular point with respect to each marking and read-out recording area of said record means when said predetermined combination of indicia is brought into registry, whereby a mark may be made through an aperture upon the underlying one of the recording areas on the marking surface of said record means, and said mark may be moved subsequently into registry with said aperture when said predetermined combination of indidia of said first and second members is again brought into registry, whereby information may be recorded on said recording areas of said record means and subsequently read-out when said selected combination of indicia is brought into registry.

2. Information storage and retrieval apparatus including: a first disc member having a receptacle therein with a hub in its center; disposable disc record means having a central aperture therein insertable in and removable from a fixed oriented position in said receptacle of said first member and having a marking surface providing information marking and read-out recording areas thereon; a second disc member carried by said first member fitting in said receptacle and overlying said receptacle and said disc record means; said second disc member having a plurality of separate marking and read-out recording apertures thereon each overlying a separate distinct one of the marking and read-out recording areas of said disc record means whereby marks may be made through said apertures on said surface of the disc record means and marks on said surface may be read through said apertures when said apertures are in registry with said marks; indicia bearing areas on the peripheral marginal portion of said first disc member and on the peripheral marginal portion of said second disc member disposed adjacent each other to coact with each other; indicia on said indicia bearing area on each of said first and second disc members comprising a plurality of combinations of numbers, letters or both numbers and letters; said second disc member and said first disc member being movable relative to each other to move said indicia bearing areas into position adjacent each other to produce a predetermined combination of indicia appearing on adjacent selected registering adjacent areas; said recording areas of said disc record means in the receptacle of said first disc member and said apertures in said second disc member being movable with respect to each other to a position in which each said marking and read-out aperture of said second disc member is disposed at a particular point with respect to each marking and read-out recording area of said disc record means in the receptacle of the first disc member when said predetermined combination of indicia is brought into registry, whereby a mark may be made through an aperture upon the underlying one of the recording areas on the marking surface of said disc record means, and said mark may be moved subsequently into registry with asid aperture when said predetermined combination of indicia of said first and second disc members is again brought into registry, whereby information may be recorded on said recording areas of said disc record means and subsequently read-out when said selected combination of indicia is brought into registry.

3. Information storage and retrieval apparatus including: a first support member having a receptacle therein defined by an upstanding peripheral flange having a plurality of separated peripheral marginal indicia bearing areas exposed on its upper surface; a central upstanding hub located centrally of said receptacle and said indicia bearing areas; a second member disposed in said receptacle having a central aperture opening engageable over said hub and having a plurality of separate marginal indicia bearing areas on its outer upper peripheral edge surface disposed adjacent and corresponding in number to the indicia bearing areas on the flange of the first member; said indicia bearing areas of said first member and said second member being defined by dividing lines extending radially from the center of the hub to the periphery of the first member; a circular boundary line defining the inner ends of the indicia bearing areas of said second member between each pair of radially extending dividing lines; said receptacle in said first member surrounding the hub and extending outwardly in a flat plane perpendicular to the axis of the hub to a point underlying the indicia bearing area around the periphery of the second member; a disposable record member removably insertable into said recess in said first member underlying said second member and having an aperture fitting the hub in said first member; the upper surface of said record member providing a marking surface for receiving marks of information thereon; means on said first member and said record member fixedly orienting said record member with respect to said first member and holding said record member against rotation about said hub; means on said first member engageable with the under side of said second member for supporting said second member for rotation about said hub above said record member; indicia on each of said indicia bearing areas of said first member comprising a plurality of numbers, letters, or both numbers and letters, in a desired predetermined sequence; indicia on each of said indicia bearing areas of said second member comprising a plurality of numbers, letters, or both numbers and letters in a desired predetermined sequence; said indicia bearing areas of said first and second members being movable into radially registering positions relative to each other to produce predetermined additional combinations of numbers, letters, or both numbers and letters, appearing on the two adjacent registering indicia bearing areas of said first member and said second member; and a plurality of separate marking and viewing aperture means in said second member one aperture means being disposed between each pair of radial dividing lines on said second member inwardly of the circular boundary line on said second member and each aperture means being spaced a predetermined separate different radial distance from the center of said second member; each of said separate aperture means being located at a position spaced radially outwardly from the hub between said pair of dividing lines overlying a particular predetermined separate marking record receiving and recordal area on the upper surface of said record member, whereby information may be marked through said aperture means into the particular separate marking record receiving and recordal area of the upper marking surface of said record member disposed beneath said aperture for the combination of indicia produced by radial registry of the two adjacent indicia bearing areas of said first and second members, said marked information being visible subsequently through said aperture when said combination of indicia bearing areas are again moved into radial registry.

4. Apparatus of the character set forth in claim 3 wherein the different radial spacing of each of said marking and viewing aperture means on said second member causes said aperture means to move in a circular path about the hub when the second member is rotated about the hub with respect to the first member to travel over an annular area on asid record member distinct from the annular area over which each other marking and viewing aperture means travels as the second member is rotated, whereby information marked on each separate marking record receiving and recordal area of said record member is visible through only the aperture means moving in the annular path in which said area is located.

5. Information storage and retrieval apparatus including: a bottom disc record receiving supporting member having a central hub and an upstanding annular peripheral flange; a marking and read-out apertured disc having a central aperture fitting the hub of the record receiving supporting member rotatably disposed within the annular flange of said bottom disc record receiving support member and having an annular marginal area divided into a plurality of indicia bearing divisions of a number equal to powers of ten by radial dividing lines extending outwardly from the central aperture to the peripheral edge of said apertured disc and to the outer edge of the upper surface of the peripheral flange of said record receiving support member to divide said upper surface of said flange into a plurality of indicia bearing divisions corresponding in number to those on the apertured disc, said indicia bearing divisions of said apertured disc radially registering with the indicia bearing divisions of the upper surface of the flange on said bottom record receiving supporting member; said annular flange on said bottom supporting member defining a receptacle in said recording receiving supporting member for said apertured disc having an annular planar supporting surface concentric with and extending radially inwardly from said flange and perpendicular to the hub and of a diameter less than the external diameter of said apertured disc, whereby the edge of said rotatable marking and read-out apertured disc is disposed within and supported by said annular planar supporting surface adjacent the edge of the receptacle; said receptacle being further deepened within the edge of the annular planar supporting surface to provide a planar record disc receiving and supporting recess surrounding said hub; a record disc removably disposed within the recess in said receptacle in the bottom supporting member and disposed to lie beneath the marking and read-out apertured disc; the upper surface of said record disc providing a marking surface for receiving information marked thereon; means fixedly orienting said record disc in said recess in said receptacle in predetermined fixed relation with respect to said bottom record receiving supporting member; the indicia bearing areas on the marginal area of the marking and read-out apertured disc being disposed adjacent the indicia bearing areas on the upper surface of the upstanding annular peripheral flange of the record receiving supporting member; indicia comprising a plurality of numbers on each indicia bearing division on the upper surface of the flange of the record receiving supporting member; indicia comprising a plurality of numbers on each indicia bearing division on the outer marginal area of the marking and read-out apertured disc arranged to be disposed in adjacent radial registry with the indicia on the indicia bearing areas of the record bearing supporting member to produce a predetermined combination of numbers when said areas are disposed in such registering radial alignment; a separate viewing aperture contained between each pair of radial dividing lines on the apertured disc spaced radially inwardly thereof a predetermined different radial distance within the indicia bearing marginal area on said read-out viewing disc, each viewing aperture being movable in an annular path over a separate information marking and record bearing area on the upper marking surface of said record disc located at a position spaced from that marking surface area on said record disc over which each other viewing aperture of said apertured disc is movable, whereby information makred on said marking surface of said record disc through the aperture in such apertured disc between the dividing lines defining a selected indicia bearing division of said apertured disc when said indicia bearing division on the apertured disc is in radial registry with a selected indicia bearing division on the flange of said bottom supporting member will be visible subsequently through said aperture when said predetermined indicia combination is again produced by radial registry of the selected indicia bearing divisions on said bottom supporting member and said apertured disc.

* * * * *